Dec. 1, 1931.  N. S. REEDER  1,834,422
DUMP CAR DOOR CONTROLLING MECHANISM
Filed March 1, 1929  2 Sheets-Sheet 1
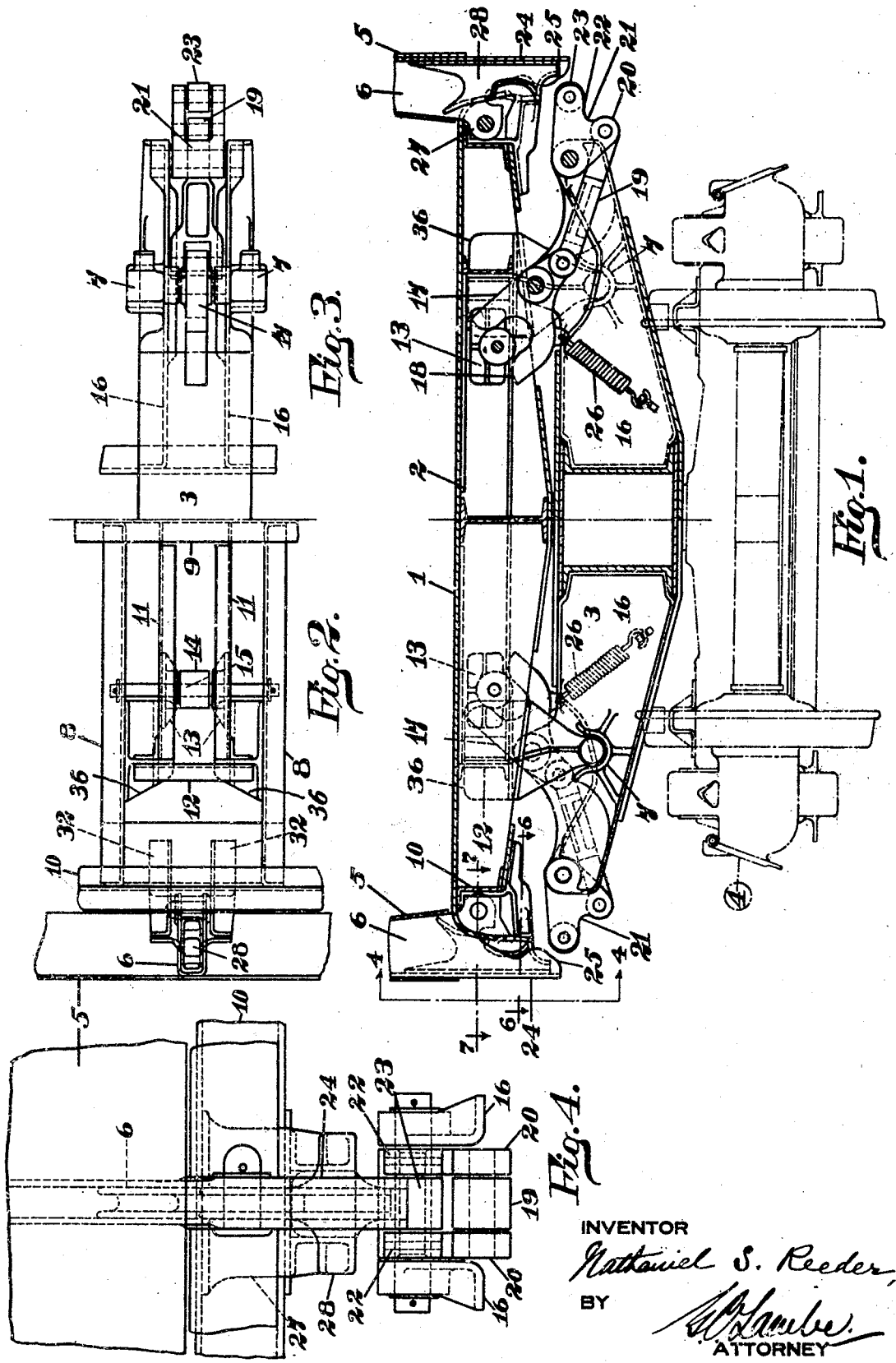
INVENTOR
Nathaniel S. Reeder,
BY
ATTORNEY

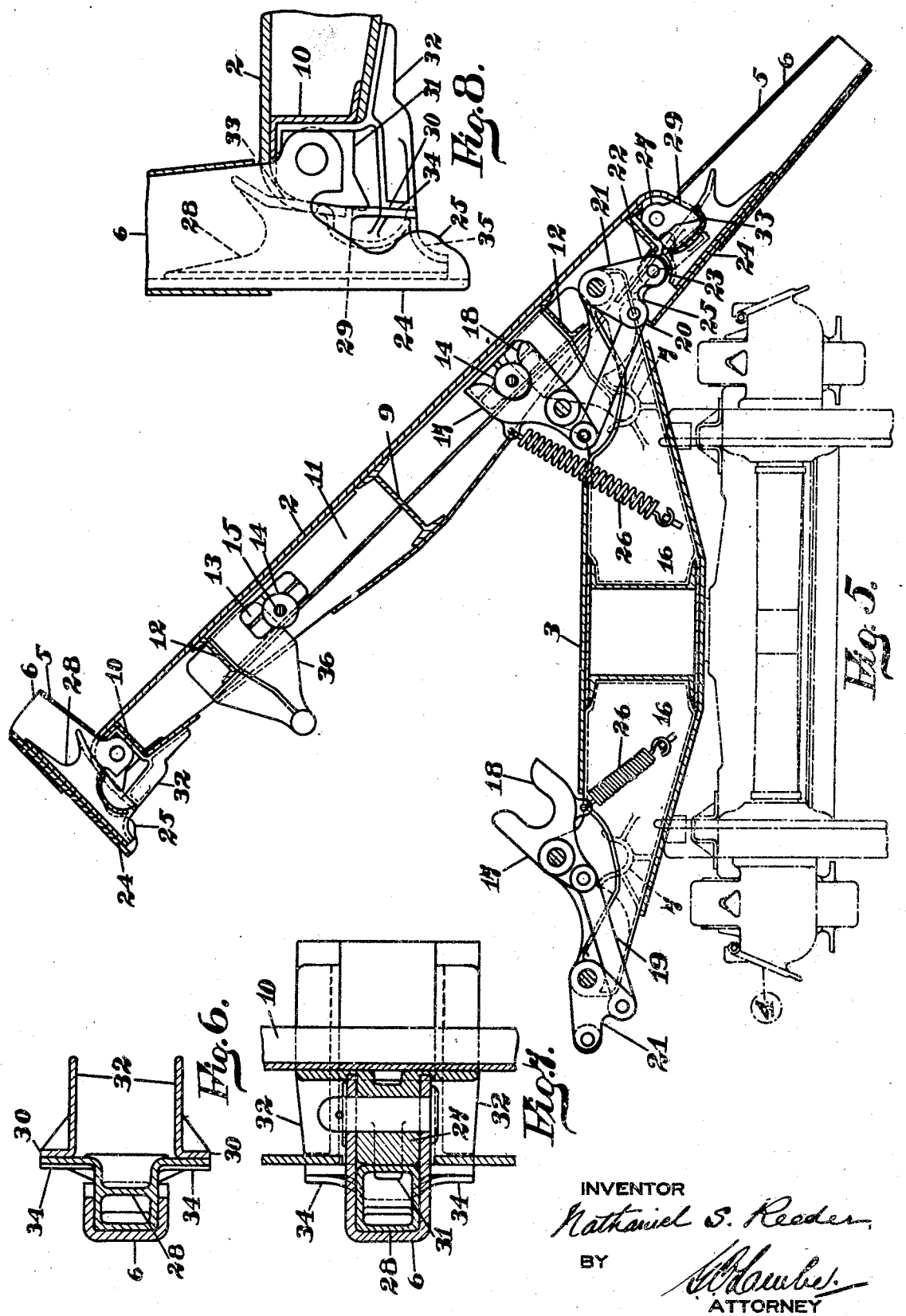

Patented Dec. 1, 1931

1,834,422

UNITED STATES PATENT OFFICE

NATHANIEL A. REEDER, OF NEW YORK, N. Y., ASSIGNOR TO PRESSED STEEL CAR COMPANY, OF PITTSBURGH, PENNSYLVANIA, A CORPORATION OF NEW JERSEY

DUMP CAR DOOR CONTROLLING MECHANISM

Application filed March 1, 1929. Serial No. 343,663.

An object of my invention is to provide an operating mechanism for the doors of a dump car which will automatically control the opening and closing movements of the doors by the tilting movements of the car body.

Another object of my invention is to provide a means for locking the doors in closed position when the body is horizontal and for releasing the door on the discharging side for opening when the body is tilted.

Another object of my invention is to provide a door controlling and locking mechanism for a dump car in which the controlling portion of the mechanism is free of the door, when the door is locked in closed position.

A further object of my invention is to provide a door locking mechanism which moves by gravity to a locking position when the door is moved to a closed position by the operating mechanism.

Referring to the drawings, Fig. 1 is a transverse section through the car showing the door operating and locking mechanism; Fig. 2 is a plan view of a portion of the car body and locking mechanism with the car floor removed; Fig. 3 is a plan view of a portion of the underframe and door operating mechanism; Fig. 4 is a view taken along the lines 4—4 of Fig. 1; Fig. 5 is a transverse section through the car showing the body in fully dumped position; Figs. 6 and 7 are sections through the door locking mechanism along the lines 6—6 and 7—7 of Fig. 5; Fig. 8 is an enlarged view of the door locking mechanism.

Referring now in detail to the drawings where like reference characters refer to like parts, reference character 1 indicates a dump car having a body 2 tiltably mounted on an underframe 3 having suitable trucks 4. At each side of the body and hinged adjacent the floor thereof are doors 5 having stakes 6 spaced longitudinally of the door. Spaced longitudinally of the car body, and at each side of the longitudinal center line are trunnion members 36 which engage with suitable bearings 7 contained on the underframe. While Figs. 1 and 5 show the body as supported on trunnions, it is well known in the prior art that other methods of supporting the body may be used, and I do not wish to limit myself to the method as shown and described, as any other suitable method of supporting the body may be used.

The body trunnions 36 are in two parts, as shown by Figs. 1, 2 and 5, and span the transverse member 16 of the underframe to engage with the bearings 7 on the sides of that member. A method of securing the trunnions to the body is shown in Fig. 2 of the drawings. The transverse members 8 extend from a central longitudinal member 9 to the side sills 10 of the body and to these members 8 are secured the trunnions 36. The trunnions have bearing surfaces to which the transverse members 11 are secured and to the longitudinal member 9. A member 12 extends between the ends of the members 11 and trunnions to securely tie them in position. The body member 14 which is selectively engaged by the door operating mechanism is secured between the members 11 on bearings 13 by means of a pin 15 passing through the members 8 and 11.

Mounted on the underframe and spaced longitudinally thereof at each side of the center line are door operating mechanisms which are wholly contained on the underframe. Each door operating mechanism at each side of the underframe is independent of any other similar mechanism and is in engagement with the car body only during the time the body is horizontal or is tilting toward the side of the car on which the mechanism is mounted and is in contact with the door stake only during the time the door is opened for discharging and in returning the door to a closed position.

By referring to Figs. 1 and 5, it will be noted that the transverse members 16 of the underframe have bifurcated end portions and the door operating mechanisms are secured between these bifurcated portions. This is a distinct advantage in increasing the stability of the car by permitting the car body to be placed closer to the underframe than is possible in other constructions. Each door operating mechanism comprises a member 17 pivotally mounted on the transverse member 16 of the underframe and having one end 18 which is adapted to selectively engage with a member 14 mounted on the car body. The other end of the member 17 is connected by means of the lever 19 to the arm 20 of the member 21 mounted on the side of the underframe adjacent the side door. The arm 22 of the member 21 has a rotatable member 23 mounted thereon which engages with the door stake of the opening door to control its movements as will be later explained. A member 26 which, in the preferred embodiment of the invention, is in the form of a tension spring ensures the proper positioning of the member 17 to engage with the body member 14 when the body returns to a horizontal position after dumping.

Referring now to Fig. 1 of the drawings, it will be seen that each device on each side of the car is a duplicate of those on the other side and that the action described for those on one side of the car when the body is tilted towards that side is the same as for those on the opposite side of the car when the body is tilted towards the opposite side. When the car body is horizontal with reference to the underframe, as shown on Fig. 1 of the drawings, the doors on each side of the body are locked in position by the locking mechanism as will later be explained, and the downward depending portions 24 of the door stakes on each side of the car body are out of contact with the door operating mechanism. When the car body begins to tilt, the depending portion 24 of the door stake moving downward faster than the member 23 causes the portion 25 of the stake to move along the member 23 until this member engages with the locking member 28. Further rotation of the body moves the locking member 28 upward away from the car body and the door is free to open. With the continued tilting of the car body, as shown on Fig. 5, the body passes out of contact with the door mechanism on the left-hand side of the car and moves outwardly and downwardly on its right hand trunnions carrying the bifurcated portion 18, of the operating member 17 on the right-hand side of the car, with it towards the right-hand side of the underframe. This movement of the member 17 causes a similar movement of the member 21, through their connection by the member 19, causing the arm 22 and attached roller 23 to move downwardly and inwardly. The side door of the car body being free of the locking mechanism opens by the force of gravity and the weight of the material being discharged and revolves about its hinges 27, causing the portion 25 of the door stake to follow the arm 22 of the member 21 until the car body reaches its final dumping angle, and the various parts of the mechanisms are in the position shown on the right side of Fig. 5. It will be noted from a study of the drawings that the door stake is held in contact with the moving arm 22 of the member 21 only by the rotation of the opening door. For this reason should the door strike an obstruction at the side of the car which would prevent its further opening, the car body would continue in its dumping movement without injury to the door parts or operating mechanism. This is further demonstrated by the fact that the door can be closed while the car is in final dumping position. Since the member 21 is at all times in the path of travel of the door stake, it is also obvious that the door cannot continue to open after the body has been tilted to an intermediate or final tilted position.

On the opposite side of the car body to that about which the body is tilting, the member 14 passes out of contact with the bifurcated portion 18 of the member 17 mounted on that side of the underframe, and the rising door is held locked in position by the locking mechanism. During the time the car body is out of engagement with the door operating mechanism the spring 26, connected to the members 17 and to the underframe, holds the bifurcated portion 18 of the member 17 in position to receive the member 14 of the car body upon the return of the body to horizontal position.

As the car body begins its righting movement in returning to horizontal position, the member 14 mounted on the body and in engagement with the member 17 causes that member to move inwardly and upwardly. The member 17 through its connection to the member 21 causes that member to move outwardly and upwardly. This outward movement of the member 21 in engagement with the door stake, combined with the rising of the side of the car body, causes the rotation of the door about its hinges until the member 21 reaches substantially its extreme outward position and the door is closed before the body is again horizontal with the underframe. At this point the locking mechanism engages with the door, locking it in position, and the door moves out of contact with the operating mechanism, as the body comes to rest on its trunnions.

The preferred embodiment of the locking mechanism, as shown in the drawings, comprises a wedge shaped member moving within the door stake and engaging with the body to hold the door in closed position until released by the door controlling mechanism, as shown in detail in Figs. 5 to 8 of the drawings. The door stake is hollowed out for a portion of its length for the reception of this wedge member. The back of the wedge engages with the door stake and the face of the wedge projects beyond the stake to engage with a portion of the door hinge and the members of the body to prevent rotation of the door on its hinges when in a closed position. The locking and unlocking action of the wedge is automatically effected by the engaging of the depending portion of the door stake with the door controlling mechanism when the car body is tilted.

Referring now to Figs. 5 and 8 of the drawings, reference character 6 indicates the door stake having a depending portion 24 containing the locking wedge member 28. Suitably formed portions 29 and 30 of the body portion 31 of the door hinge and the members 32 fastened to the body, conform in contour to the portions 33 and 34 of the face of the wedge member and through engagement of these members automatically locks the door when in a closed position.

When the car body is tilted and the depending door members on the side of the body towards which the lading is being discharged engage with the door controlling mechanism, the wedge member 28 is moved upwardly to a release position. The member 23 on the arm 22 of the door controlling mechanism engages with the surfaces 25 of the door stake and moves along these surfaces as the body is tilted. The wedge member is contained between these surfaces 25 of the door stake and extends beyond the stake so that the surface 35 of the wedge member engages with the member 23 as it moves along the door stake and the member is moved longitudinally of the stake until the surface 33 of the wedge is free of the member 29 of the door hinge and the door is free to open. The opening of the door and movements of the controlling mechanism takes place as previously described.

After the door begins to open, the rotation of the stakes and wedge member about the hinge brings the portion 29 of the door hinge into contact with the wedge, as shown in Fig. 5, and holds the wedge in release position. When the door control mechanism returns the door to a closed position, the wedge rotates with the door stake and is held in release position until the portion 29 moves out of contact with the wedge as the door is moved to closed position and the wedge drops by gravity to the position shown in Fig. 8, locking the door in position. The member 23 of the controlling mechanism moves free of the stakes as the righting movement continues and the body returns to a horizontal position, as shown in Fig. 1.

Having thus described the invention what I claim as new and desire to secure by Letters Patent is:

1. In a dump car, an underframe, a dump body tiltably mounted on said underframe, side doors for said body hinged adjacent the floor thereof and folding down in opening, downward depending members on said doors, mechanisms mounted on said underframe for operating each side door, said mechanisms comprising a member rotatably mounted on the underframe and movable into and out of contact with said depending door member by the tilting movements of the car body, and providing a movable cam which controls the opening of the door and exerts an outward thrust on said depending door member to close the door as the car body returns to a horizontal position, and a suitable mechanism for locking said doors when in closed position.

2. In a dump car, an underframe, a dump body tiltably mounted on said underframe, side doors for said body hinged adjacent the floor thereof and folding down in opening, downward depending members on said doors, a member rotatably mounted on said underframe adjacent each depending door member, said rotatable member being operated by the tilting of said body to interpose said member in the path of said depending member of the discharging door during the tilting and righting movements of said body, and suitable means for holding the inoperative door closed.

3. In a dump car, an underframe, a dump body tiltably mounted on said underframe side doors for said body hinged adjacent the floor thereof and folding down in opening, downward depending members on said doors, means mounted on each side of said underframe adjacent to and normally out of contact with said depending door members, said means being controlled by said body when tilting towards their respective sides to engage with said depending members of the discharging door to limit the opening of said door and to return said door to a closed position with the righting of the car body, and a member mounted on each door and engaging with the body for locking said door when in a closed position, said means moving said last mentioned member on the discharging door to an inoperative position as the body is tilted.

4. In a dump car, an underframe, a dump body tiltably mounted on said underframe, side doors for said body hinged adjacent the floor thereof and folding down in opening, downward depending members on said doors, means mounted at each side of the underframe, said means comprising a member mounted on the underframe adjacent to said depending door member and actuated by the tilting body when dumping toward said member to limit the opening of the adjacent door and to control the rotation of said door to a closed position with the righting of the body, and a locking device mounted on said door and actuated by gravity to lock said door as the body resumes a horizontal position, said means moving the locking member of the discharging door to an inoperative position as the body is tilted.

5. In a dump car, an underframe, a dump body tiltably mounted on said underframe, side doors for said body hinged adjacent the floor thereof and folding down in opening, downward depending members on said doors, independent mechanisms for each side door mounted on the underframe and operated by the tilting car body for controlling the opening and closing movements of said doors, said mechanism comprising a member rotatably mounted on the underframe adjacent the depending door member, a member mounted on the underframe and having a selective engagement with the tilting car body and a connecting means between said members.

6. In a dump car, an underframe, a dump body tiltably mounted on said underframe, side doors for said body hinged adjacent the floor thereof and folding down in opening, downward depending members on said doors, independent mechanisms for each side door mounted on the underframe, said mechanisms comprising a member pivotally mounted on the underframe adjacent said door, a member mounted on the underframe spaced from said first mentioned member and having a selective engagement with the body and a connecting means between said members, and means mounted on each door and actuated by gravity for locking the doors when returned to a closed position, said locking means being moved to inoperative position by the door operating mechanism at the side towards which the body is dumping.

7. In a dump car, an underframe, a dump body tiltably mounted on said underframe, side doors for said body hinged adjacent the floor thereof and folding down in opening, downward depending members on said doors, independent mechanisms for each side door controlling the opening and closing movements of said doors, said mechanisms comprising a member mounted on the underframe and having a selective engagement with the car body, a member mounted on the underframe and selectively engaging with said depending door member, said last mentioned member being operated and controlled by said first mentioned member, and a member mounted within said depending door member for locking the door when in closed position.

8. In a dump car, an underframe, a car body tiltably mounted on trunnions at the sides of said underframe and tilting to either side thereof in dumping, doors hinged to the sides of said body adjacent the floor thereof and folding down in opening, downward depending members on said doors, independent mechanisms for each side door limiting the opening and forcing the closing of said door at the side toward which the body is tilting, said mechanisms comprising a member pivoted to the underframe and having a selective engagement with said body, a member pivoted to the underframe adjacent the side thereof and engaging with the downward depending member of its respective door after said door begins to open with the tilting movement of said body, and a member connecting said pivotally mounted members.

9. In a dump car, an underframe, a car body tiltably mounted on said underframe and tilting to either side in dumping, side doors for said body hinged adjacent the floor thereof and folding downward in opening, downward depending members on said doors, independent door operating mechanisms for each door pivotally mounted on the underframe and operated by the tilting movement of the body for selectively controlling the opening and closing of the discharging door, said door operating mechanisms comprising a body engaging member pivoted on the underframe, a door engaging member pivotally mounted on the underframe adjacent to said downward depending portions of the door and engaging with said depending door member after the body begins to tilt, and a connecting member pivotally mounted on the ends of said members.

10. The combination in a dump car of an underframe, a dump body supported on said underframe and tilting to either side thereof in dumping, side doors for said body hinged adjacent the floor and folding downward in opening, downward depending portions on said doors, and independent mechanisms for each door which control the opening and closing movements of said door during the movements of the tilting body, said mechanisms comprising a member mounted on the body, a member pivotally mounted on the underframe and having a bifurcated portion at one end engaging said body mounted member, a door controlling member pivotally mounted on the underframe, and a member connecting said pivotally mounted members, said door controlling member engaging the downward depending portion of the opening door to limit the opening and force the closing of said door.

11. In a dump car, an underframe, a dump body supported on trunnions at each side of said underframe, side doors for said body hinged adjacent the floor thereof, means at each side of said body for controlling the movement of said doors, said means comprising a member mounted on said underframe and actuated by the tilting movements of the body, a member mounted on said door and in engagement with said body, a member mounted on the underframe in engagement with said body and a member connecting said members mounted on the underframe, said member mounted on the door being engaged by the adjacent underframe mounted member as the body is tilted to release the descending door for opening.

12. In a dump car, an underframe, a dump body tiltably mounted on said underframe, side doors for said body hinged adjacent the floor thereof, hollow downward depending members on said doors, a member mounted on the underframe adjacent said depending door member, a member mounted within said depending member and engaging with the body when the door is in closed position, a member mounted on the underframe and in engagement with said body, said last mentioned member being actuated by the tilting body to move the member mounted on the underframe adjacent the depending door member longitudinally of said depending door member and into engagement with the contained member as the body is tilted.

13. In a dump car, an underframe, a dump body tiltably mounted on said underframe, side doors for said body hinged adjacent the floor thereof, downward depending members on said doors, means mounted within said depending door members and engaging with the body to lock said doors when in closed position, a member mounted on the underframe and controlled by the tilting movements of the body when tilting towards its respective side of the underframe, said last mentioned member engaging with said depending door member when the body is tilted to unlock and limit the opening of the door with the continued tilting of the body and to return said door to a closed position to permit the locking means to engage with the body before the body resumes a position horizontal with the underframe.

14. In a dump car, an underframe, a dump body tiltably mounted on said underframe and tilting about either side thereof in dumping, side doors for said body hinged adjacent the floor thereof, independent mechanisms for each side door mounted on the underframe for controlling the opening and closing movements of said doors, independent mechanisms mounted on said doors and engaging with the body for locking said doors when in closed position, said door controlling mechanisms being controlled by the tilting movements of the body and in engagement with the door only at the side towards which the body is dumping, said door controlling mechanism releasing the locking mechanisms of the doors with which they are in contact.

15. In a dump car, an underframe, a body tiltably mounted on said underframe, a door for said body hinged adjacent the floor thereof, a member mounted on said underframe adjacent said door, said member being rotatably mounted and normally free of said door, and actuated by the movement of the tilting body to limit the opening of the door in proportion to the tilting of the body.

16. In a dump car, an underframe, a body tiltably mounted on said underframe, a door for said body hinged adjacent the floor thereof, a member mounted on said door for locking same in closed position and means for releasing said locking means to permit the opening of the door when the body is tilted, said locking means automatically returning to locking position when the door is closed as the body is righted.

NATHANIEL S. REEDER.